(12) United States Patent
Choi et al.

(10) Patent No.: US 7,048,955 B2
(45) Date of Patent: May 23, 2006

(54) SOYBEAN PHOSPHOPEPTIDE CALCIUM AND METHOD FOR PRODUCING THEREOF

(75) Inventors: Sangyun Choi, Seoul (KR); Shinhee Lee, Seoul (KR); Jungik Yang, Seoul (KR)

(73) Assignee: Korea University Foundation, Seoul (KR)

( * ) Notice: Subject to any disclaimer, the term of this patent is extended or adjusted under 35 U.S.C. 154(b) by 87 days.

(21) Appl. No.: 10/478,132

(22) PCT Filed: Dec. 12, 2002

(86) PCT No.: PCT/KR02/02349

§ 371 (c)(1),
(2), (4) Date: Nov. 20, 2003

(87) PCT Pub. No.: WO03/053995

PCT Pub. Date: Jul. 3, 2003

(65) Prior Publication Data

US 2004/0121427 A1    Jun. 24, 2004

(30) Foreign Application Priority Data

Dec. 12, 2001 (KR) .................. 10-2001-0078478

(51) Int. Cl.
A23J 3/16 (2006.01)
A23J 3/34 (2006.01)
A23L 1/20 (2006.01)

(52) U.S. Cl. .................. 426/46; 426/52; 435/68.1

(58) Field of Classification Search .................. 426/46, 426/49, 52, 74; 435/68.1; 530/402, 407
See application file for complete search history.

(56) References Cited

U.S. PATENT DOCUMENTS 3,645,745 A * 2/1972 Magnino et al. ............. 530/378
3,713,843 A * 1/1973 Pour-el et al. ................ 426/44

(Continued)

FOREIGN PATENT DOCUMENTS

JP    62-253358 A    11/1987

(Continued)

OTHER PUBLICATIONS

Yeon Sook Lee et al, Intestinal absorption of calcium in rats given diets containing casein or amino acid mixture: the role of casein phosphopeptides, Dpt of Agricultural Chemistry, University of Tokyo, Japan, Br. J. Nutr. (1983), 49, 67.

(Continued)

*Primary Examiner*—Keith Hendricks
(74) *Attorney, Agent, or Firm*—Birch, Stewart, Kolasch & Birch, LLP

(57) ABSTRACT

The present invention relates to soybean phosphopeptide calcium and method for producing thereof, wherein the soybean phosphopeptide calcium is produced by calcium-binding reaction of soybean phosphopeptides which are obtained from hydrolysis with hydrolase followed by chemical phosphorlyation of soybean protein using polyphosphate salts or inversely from the procedure of chemical phosphorlyation before hydrolysis with hydrolases. The optimum conditions for the sequential reactions of enzymatic hydrolysis, phosphorylation and calcium binding were established.

The soybean phosphopeptide calcium has a high solubility in water and an efficient absorption rate of calcium in a living body.

6 Claims, 2 Drawing Sheets

U.S. PATENT DOCUMENTS

| | | | |
|---|---|---|---|
| 3,846,560 A * | 11/1974 | Hempenius et al. | 426/18 |
| 4,322,344 A * | 3/1982 | Chen et al. | 530/378 |
| 4,642,238 A | 2/1987 | Lin et al. | |
| 4,697,004 A | 9/1987 | Puski et al. | |
| 5,112,812 A | 5/1992 | Samuelsson et al. | |
| 6,258,387 B1 * | 7/2001 | McEwen et al. | 424/757 |
| 6,313,273 B1 * | 11/2001 | Thomas et al. | 530/378 |
| 6,471,981 B1 * | 10/2002 | Hahn | 424/439 |
| 6,566,134 B1 * | 5/2003 | Bringe | 435/410 |

FOREIGN PATENT DOCUMENTS

| | | |
|---|---|---|
| KR | 1985-1409 | 3/1985 |

OTHER PUBLICATIONS

W. Manson & al., The Structure of Phosphopeptide Derived from β-Casein, Archives of Biochemistry and Biophysics, 145: 16-26 (1971), The Hannah Dairy Research Institute Ayr, Scotland.

Elizabeth W. Bingham et al, Phosphorylation of β-Casein and -Lactalbumin by Casein Kinase from Lactating Bovine Mammary Gland, J. Diary Sci.1988, 71: 324-36, US Department of Agriculture, Eastern Regional Research Center, Wyndmoor, PA, U.S.A.

Ryuichiro Sato et al, Casein Phosphopeptide (CPP) Enhances Calcium Absorption from litigated Segment of Rat Small Intestine, Department of Agricultural Chemistry, the University of Tokyo, Tokyo, Japan, J. Nutr. Sci. Vitamino, 1986, 32:67-76.

H.M. Mykkanen et al. Enhanced Absorption of Calcium by Casein Phosphopeptides in Rachitic and Normal Chicks, Dpt of Physical Biology/Section of Physiology, Cornell University, Ithaca, NY 14853, US, J. Nutr. 1980, 110:2141-2148.

* cited by examiner

SOYBEAN PHOSPHOPEPTIDE CALCIUM AND METHOD FOR PRODUCING THEREOF

This application is the national phase under 35 U.S.C. § 371 of PCT International Application No. PCT/KR02/02349 which has an International filing date of Dec. 12, 2002, which designated the United States of America.

TECHNICAL FIELD

The present invention relates to soybean phosphopeptide calcium and method for producing thereof. More particularly, the present invention relates to soybean phosphophep-eptide calcium with high solubility and absorption efficiency obtained by hydrolysis, phosphorylation and calcium attaching reaction of soybean protein isolated from soybean and method for producing thereof.

BACKGROUND ART

The Calcium ion is one of elements having a highest content in the body, which exists in the bone structure, cells and body liquid to take part in neurotransmission and muscle contraction and also is involved in wide physiological actions such as by delivering various stimuli such as growth factors or hormones to cells. Most of calcium in a human body exists in bones and teeth in the form of calcium phosphate. However, with advancing years, the absorption rate of calcium decreases, whereby calcium in the bone escapes, causing bone-related diseases such as osteoporosis and osteomalacia.

The calcium absorption in the digestive organs is known to depend on the state of calcium per se in an aqueous solution. Thus, in the stomach and intestines having a low pH, calcium is maintained in the ion state so that it can be in large part absorbed, while in the lower small intestines where the pH is near neutrality, it forms an insoluble salt with phosphorous which can not be absorbed and thereby is excreted out of the body. Excessive intake of such insoluble calcium is known to cause a calculus.

It has been reported that whey calcium present in milk has the highest absorption rate of food. This is believed because lactose in the milk may promote the absorption of the whey calcium. However, it is recently proposed that the highest absorption rate of the whey calcium is because phosphopeptide which is an enzymatic hydrolysate of whey protein inhibits formation of calcium phosphate in the digestive organs of the human body. It is known that the phosphopeptide is not digested by digestive enzymes but forms water-soluble complex with calcium ion.

Manson, et al. separated phosphopeptide composed of 25 amino acids from enzymatic hydrolysates of β-casein and showed that this phosphopeptide comprising 4 phosphoserines (*Arch. Biochem. Biophys.* 145:16–26). Thus, it was discovered that the phosphate group ($PO_4^{3-}$) attached to serine residue of phosphopeptide forms the water soluble complex with calcium in the digestive organs and was thereby assumed that the increase in solubility of calcium by casein phosphopeptide is attributable to the phosphate group of the phosphopeptide. Also, according to various animal tests, it was shown that phosphopeptide increases the amount of soluble calcium, thereby promoting the absorption thereof (*J. Nutr.* 110:2141–2148, *Br. J. Nutr.* 49:67–76). Sato, et al. in Japan found that casein phosphopeptide can increase the calcium absorption in the small intestines of rats via in vitro experiment (*J. Nutr. Sci. Vitaminol.* 32:67–76).

Phosphorylation of casein phosphopeptide existing in milk is a reaction which specifically occurs by casein kinases in golgi complex after casein passes through the membrane of endoplasmic reticulum (*J. Dairy. Sci.* 71:324–336). Up to date, it has been shown that the casein phosphopeptide in milk among natural food can most effectively promote the calcium absorption to the body. However, since the casein phosphopeptide is extracted from milk, there is a problem in that the production amount is limited.

Therefore, there is demand for new and stable food and medical material which has an increased binding ability to calcium and solubility, thereby being readily absorbed in the human body.

Soybean protein is generalized comparable to milk protein and dietetically superior and has a high economical efficiency. However, the soybean protein does not contain calcium since it cannot be phosphorylated in plants and thus cannot be a main source of calcium. Therefore, it would be significant if peptide obtained from natural soybean protein can be effectively phosphorylated to develop calcium preparations having high calcium-binding ability, solubility in water and absorption rate in the body.

In view of the circumstances as described above, the present inventors have prepared soybean phosphopeptide calcium by chemically phosphorylating isolated soybean protein and hydrolyzing the product by a hydrolase, or enzymatically hydrolyzing isolated soybean protein and phosphorylating the hydrolysate, followed by calcium-binding reaction and examined the calcium-binding ability of the soybean phosphopeptide calcium. The present invention is completed based on the above works.

DISCLOSURE OF INVENTION

Therefore, an object of the present invention is to provide calcium preparation which is effective and economical to substitute expensive casein phosphopeptide by hydrolysis, phosphorylation and calcium-binding reaction of soybean protein.

Another object of the present invention is to provide method for producing soybean phosphopeptide calcium with high efficiency from isolated soybean protein including the whole procedures and optimal conditions thereof, which is distinguished from inventions directed to sub-processes such as hydrolysis and phosphorylation.

In accordance with the present invention, the above and other objects can be accomplished by chemically phosphorylating isolated soybean protein with a phosphate and hydrolyzing the product by a hydrolase, or enzymatically hydrolyzing isolated soybean protein and phosphorylating the hydrolysate, followed by calcium-binding reaction and examining the calcium-binding ability of the soybean phosphopeptide calcium.

BRIEF DESCRIPTION OF DRAWINGS

The above and other objects, features and advantages of the present invention will be more clearly understood from the following detailed description taken in conjunction with the accompanying drawings, in which.

BEST MODE FOR CARRYING OUT THE INVENTION

Figure 1:
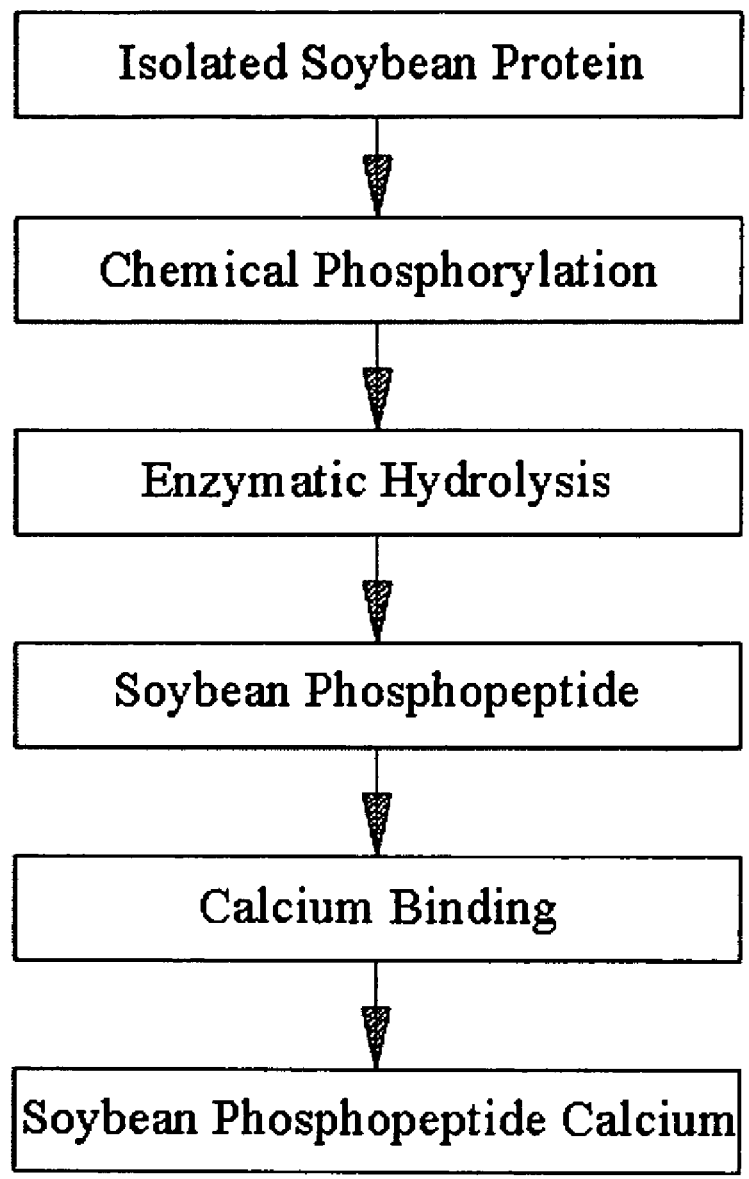
FIG. 1 is a block diagram showing the method for production of soybean phosphopeptide calcium using pre-phosphorylation-post-hydrolysis procedures.
Figure 2:
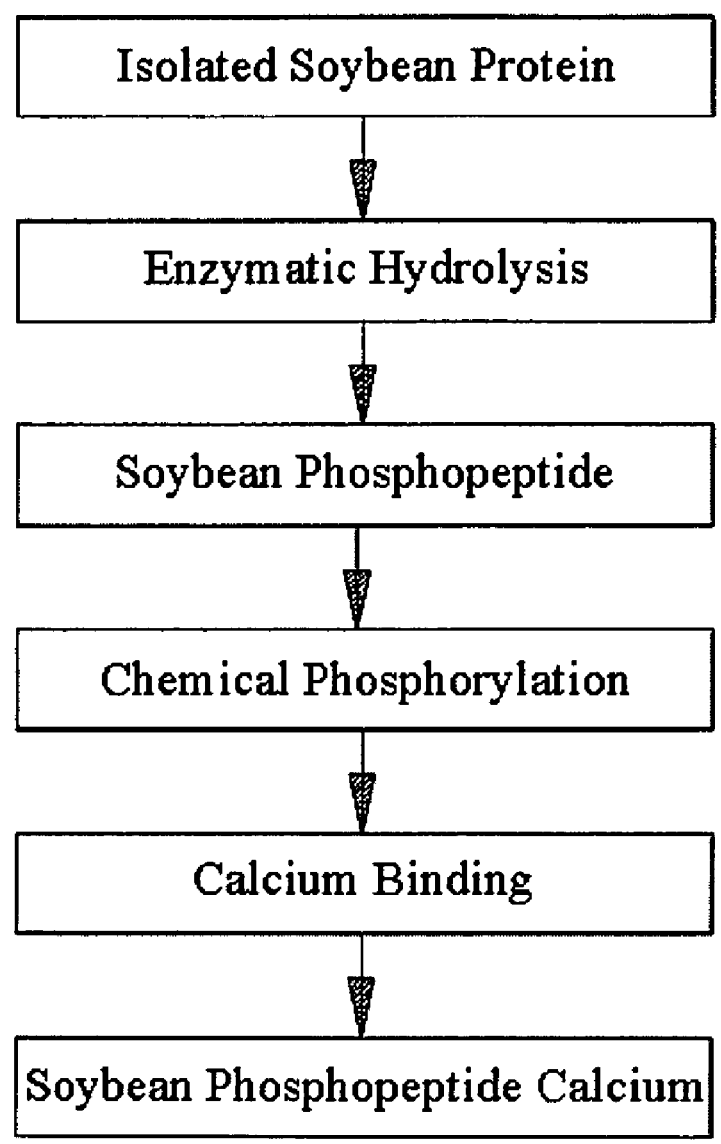
FIG. 2 is a block diagram showing the method for production of soybean phosphopeptide calcium using pre-hydrolysis-post-phosphorylation procedures.

Now, the present invention will be described in detail. The method for producing soybean phosphopeptide calcium according to the present invention includes the steps of: chemically phosphorylating isolated soybean protein with a phosphate and hydrolyzing the product by a hydrolase, followed by calcium-binding reaction to prepare soybean phosphopeptide calcium; enzymatically hydrolyzing isolated soybean protein and phosphorylating the hydrolysate, followed by calcium-binding reaction to prepare soybean phosphopeptide calcium; and measuring the calcium-binding ability of the soybean phosphopeptide calcium prepared in the above two steps.

The soybean phosphopeptide according to the present invention comprises plenty of phosphate groups in hydroxyl (—OH) groups capable of being phosphorylated or amino acid residues carrying negative charge (−), including serine residue of soybean peptide partially cleaved from soybean protein.

In the present invention, preferred examples of the hydrolase which can be used to hydrolyze the soybean protein include protein hydrolases such as pepsin, trypsin, alcalase, bromelain, papain, or neutrase in order to secure uniformity of product quality and save the process time, though the soybean protein may be partially cleaved by various protein kinases, strong acid or strong alkali.

In the procedure to covalently bond a phosphate group to a soybean peptide, chemical reaction is advantageously employed in terms of economic aspect as well as improvement of phosphorylation efficiency, though various protein kinases such as casein kinase may be used.

As a source for supplying phosphate groups in addition to a small amount phosphate groups existing in isolated soybean protein, any phosphate can be selected which can change various physical and chemical properties of soybean peptide via phosphorylation without loss of nutrition.

According to the present invention, in order to more effectively accomplish the calcium binding and produce environmentally friendly products, the method comprises treating isolated soybean protein with a phosphate, followed by hydrolysis, or hydrolyzing isolated soybean protein, followed by treating with a phosphate.

In the present invention, the phosphate for phosphorylation of isolated soybean protein is preferably used in a concentration of 0.001 to 1% (v/v).

The pre-phosphorylation and post-hydrolysis method is conducted by phosphorylating soybean protein with a phosphate as a chemical phosphorylating agent and hydrolyzing the resulting protein with an enzyme to prepare phosphorylated soybean peptide, followed by isolation and purification. The pre-hydrolysis and post-phosphorylation method is conducted by hydrolyzing soybean protein with an enzyme and phosphorylating the hydrolysate, followed by purification.

Now, the present invention will be concretely explained using the following examples. However, it should be understood that the present invention is not limited thereto.

EXAMPLE 1

Preparation of Soybean Phosphopeptide Calcium Via Pre-Phosphorylation—Post-Hydrolysis Isolated soybean protein was dissolved and thoroughly mixed in distilled water at a concentration of 10%. The mixture was centrifuged at 10,000×g for 30 minutes and the supernatant was separated. According to a phosphate group level in the isolated soybean protein per se, the supernatant could be used as it was or a phosphate, including, for example, sodium metaphosphate, sodium trimetaphosphate, sodium polyphosphate, etc. was additionally added thereto in a concentration of 1%(v/v) and was allowed to be left for reaction at 35° C. for 3 hours. The reaction was then acidified with a hydrochloric acid solution (HCl) to pH 8.0. Subsequently, the reaction was hydrolyzed with trypsin as a hydrolase for several hours while varying the proportion of the substrate with respect to the enzyme in the reaction. The reaction was treated with calcium chloride at a concentration of 1% at room temperature for 1 hour while adjusting the pH to 10.5 with a sodium hydroxide (NaOH) solution to perform the calcium-binding reaction.

After completion of the above procedures, soybean phosphopeptide calcium was isolated and purified via centrifugation or dialysis to remove residual sodium phosphate and by-products.

EXAMPLE 2

Preparation of Soybean Phosphopeptide Calcium Via Pre-Phosphorylation—Post-Hydrolysis Using Different Concentrations of Phosphates Isolated soybean protein was dissolved in distilled water at a concentration of 10% while stirring. The mixture was centrifuged at 10,000×g for 30 minutes and the supernatant was separated. According to a phosphate group level in the isolated soybean protein per se, the supernatant could be used as it was or a phosphate, including, for example, sodium metaphosphate, sodium trimetaphosphate, sodium polyphosphate, etc. was additionally added thereto in a concentration of 0.001%(v/v) and was allowed to be left for reaction at 35° C. for 3 hours. The reaction was then acidified with a hydrochloric acid solution (HCl) to pH 8.0. Subsequently, the reaction was hydrolyzed with trypsin as a hydrolase for several hours while varying the proportion of the substrate with respect to the enzyme in the reaction. The reaction was treated with calcium chloride at a concentration of 1% at room temperature for 1 hour while adjusting the pH to 10.5 with a sodium hydroxide (NaOH) solution to perform the calcium-binding reaction.

After completion of the above procedures, soybean phosphopeptide calcium was isolated and purified via centrifugation or dialysis to remove residual sodium phosphate and by-products.

EXAMPLE 3

Preparation of Soybean Phosphopeptide Calcium Via Pre-Hydrolysis—Post-Phosphorylation Isolated soybean protein was dissolved and thoroughly mixed in distilled water at a concentration of 10%. The mixture was centrifuged at 10,000×g for 30 minutes and the supernatant was separated. The supernatant was hydrolyzed with trypsin as a hydrolase and the pH of the reaction was adjusted to 9.0. According to a phosphate group level in the isolated soybean protein per se, the hydrolysate could be used as it was or a phosphate, including, for example, sodium metaphosphate, sodium trimetaphosphate, sodium polyphosphate, etc. was additionally added thereto in a concentration of 1% (v/v) and was allowed to be left for reaction at 35° C. for 3 hours. The reaction was then treated with calcium chloride at a concentration of 1% at room temperature for 1 hour while adjusting the pH to 10.5 with a sodium hydroxide (NaOH) solution to perform the calcium-binding reaction.

After completion of the above procedures, soybean phosphopeptide calcium was isolated and purified via centrifugation or dialysis to remove residual sodium phosphate and by-products.

EXAMPLE 4

Preparation of Soybean Phosphopeptide Calcium Via Pre-Hydrolysis—Post-Phosphorylation Using Different Concentrations of Phosphates Isolated soybean protein was dissolved and thoroughly mixed in distilled water at a concentration of 10%. The mixture was centrifuged at 10,000×g for 30 minutes and the supernatant was separated. The supernatant was hydrolyzed with trypsin as a hydrolase and the pH of the reaction was adjusted to 9.0. According to a phosphate group level in the isolated soybean protein per se, the hydrolysate could be used as it was or a phosphate, including, for example, sodium metaphosphate, sodium trimetaphosphate, sodium polyphosphate, etc. was additionally added thereto in a concentration of 0.001%(y/v) and was allowed to be left for reaction at 35° C. for 3 hours. The reaction was then treated with calcium chloride at a concentration of 1% at room temperature for 1 hour while adjusting the pH to 10.5 with a sodium hydroxide (NaOH) solution to perform the calcium-binding reaction.

After completion of the above procedures, soybean phosphopeptide calcium was isolated and purified via centrifugation or dialysis to remove residual sodium phosphate and by-products

EXAMPLE 5

Comparison of Calcium Binding Ability

In order to compare the soybean phosphopeptide calcium prepared from the above Examples, each one of soybean phosphopeptide calcium prepared from the Examples 1 to 4 was dissolved in water and TCA (trichloroacetic acid) was added thereto in a final concentration of 10%. Then, the reaction was left at −20° C. for 12 hours to obtain precipitates. The precipitates were separated by centrifugation at 2,500 rpm for 30 minutes and were burned at 550° C. for 4 hours. The resulting product was dissolved in 10 mL of 3N HCl, diluted with 5% $La_2O_3$ and ultra pure distilled water and quantified using the Atomic absorption spectrophotometer. The yield was calculated by the following equation: [measured calcium (bonded calcium) amount/added calcium amount]×100. As a result, it was shown that the samples of Example 3 and Example 4 where the phosphorylation was performed prior to hydrolysis had high calcium-binding ability. The results are shown in Table 1, below.

TABLE 1

|  | Rate of bonded calcium (%) |
| --- | --- |
| Example 1 | 1.2 |
| Example 2 | 1.5 |
| Example 3 | 2.8 |
| Example 4 | 4.0 |

The calcium-binding ability of non-phosphorylated soybean peptide was compared to that of phosphorylated soybean peptide at various concentration of soybean peptide. The calcium-binding ability was measured as described above. The results are shown in Table 2. It was noted that the phosphorylated soybean peptide has a calcium-binding ability much higher than that of the non-phosphorylated soybean peptide.

TABLE 2

| Soybean peptide | ISP hydrolysate concentration (ppm) | Content of bonded calcium (ppm) |
| --- | --- | --- |
| Non-phosphorylation | 50 | 1.8 |
|  | 150 | 8.8 |
| Phosphorylation | 50 | 8.2 |
|  | 150 | 26 |

INDUSTRIAL APPLICABILITY

As described above, the soybean phosphopeptide calcium according to the present invention has a high calcium-binding ability and solubility in water and thus can be usefully used in food and drug industries.

What is claimed:

1. A method for producing soybean calcium phosphopeptide comprising chemically phosphorylating isolated soybean protein with 0.001 to 1% (v/v) of a phosphate, hydrolyzing the product by a hydrolase, and binding of calcium, followed by isolating and purifying the soybean calcium phosphopeptide by centrifugation or dialysis.

2. A method for producing soybean calcium phosphopeptide comprising enzymatically hydrolyzing isolated soybean protein, phosphorylating the hydrolysate with 0.001 to 1% (v/v) of a phosphate for 3 hours, followed by binding of calcium for 1 hour, followed by isolating and purifying the soybean calcium phosphopeptide by centrifugation or dialysis.

3. The method according to claim 1, wherein the hydrolase is any one selected from the group consisting of trypsin, pepsin, alcalase, bromelain, papain and neutrase.

4. The method according to claim 1 or 2, wherein the phosphate is any one selected from the group consisting of sodium metaphosphate, sodium trimetaphosphate and sodium polyphosphate.

5. The method according to claim 2, wherein said isolated soybean protein is hydrolyzed with a hydrolase selected from the group consisting of trypsin, pepsin, alcalase, bromelain, papain and neutrase.

6. A method for producing soybean calcium phosphopeptide comprising
  enzymatically hydrolyzing isolated soybean, protein,
  phosphorylating the hydrolysate with 0.001 to 1% (v/v) of a phosphate, and
  after phosphorylation, binding of calcium, followed by isolating and purifying the soybean calcium phosphopeptide by centrifugation or dialysis.

* * * * *